United States Patent
Srygley et al.

[11] Patent Number: 6,034,615
[45] Date of Patent: Mar. 7, 2000

[54] AUTOMATIC REVOLUTION COUNTING AND DATA TRANSMISSION DEVICE

[76] Inventors: James G. Srygley, 3939 E. Hwy. 80; John S. Elliott, 1813 Pinehurst, #8105, both of Mesquite, Tex. 75150

[21] Appl. No.: 08/653,842

[22] Filed: May 28, 1996

Related U.S. Application Data

[63] Continuation-in-part of application No. 08/334,270, Nov. 4, 1994, Pat. No. 5,524,034, which is a continuation of application No. 07/877,877, May 4, 1992, abandoned.

[51] Int. Cl.⁷ .................................................. G08B 21/00
[52] U.S. Cl. ................... 340/820.31; 340/540; 340/686; 340/689; 340/825.54
[58] Field of Search .................... 340/870.16, 870.01, 340/870.31, 870.02, 870.03, 689, 539, 540, 612, 825.54, 825.55, 686; 200/61.52, 61.45 R

[56] References Cited

U.S. PATENT DOCUMENTS

| | | | |
|---|---|---|---|
| 4,614,945 | 9/1986 | Brunius | 340/870.03 |
| 4,697,278 | 9/1987 | Fleischer . | |
| 4,823,367 | 4/1989 | Kreutzfeld . | |
| 4,989,222 | 1/1991 | Lutts et al. . | |
| 5,130,955 | 7/1992 | Luerker et al. . | |
| 5,230,393 | 7/1993 | Mezey | 177/139 |
| 5,481,245 | 1/1996 | Moldavsky | 340/540 |
| 5,528,228 | 6/1996 | Wilk | 340/686 |

FOREIGN PATENT DOCUMENTS

| | | |
|---|---|---|
| 1595947 | 8/1981 | United Kingdom . |
| 2242527 | 10/1991 | United Kingdom . |
| WO 91/20057 A1 | 12/1991 | WIPO . |

*Primary Examiner*—Michael Horabik
*Assistant Examiner*—Albert K. Wong
*Attorney, Agent, or Firm*—David W. Carstens; Carstens, Yee & Cahoon, L.L.P.

[57] ABSTRACT

An automatic partial revolution detection, counting, and data transmission device for detecting partial revolutions of all or a portion of a container to which the device is attached. An embodiment of the invention for detecting the partial rotation and dumping of a container to which the device is attached uses a housing, printed circuit board with all electronic circuitry for sensing rotation, data storage, and two-way data communication. A low power radio frequency transmitter and receiver are used to receive commands and to transfer stored data to a receiving unit which may be a portable battery-powered unit or a fixed mount unit.

18 Claims, 1 Drawing Sheet

6,034,615

AUTOMATIC REVOLUTION COUNTING AND DATA TRANSMISSION DEVICE

CROSS-REFERENCE TO RELATED APPLICATIONS

This is a continuation-in-part application of application Ser. No. 08/334,270, now U.S. Pat. No. 5,524,034 filed Nov. 4, 1994 which is a continuation of application Ser. No. 07/877,877, filed May 4, 1992, now abandoned.

TECHNICAL FIELD OF THE INVENTION

The present invention relates to an automatic partial revolution detection, counting, and data transmission device. Specifically, the device is mounted to a container which is partially rotated to dump the container contents. The device detects this partial rotation of the container and stores or transmits the date and time of the partial rotation event and ID number assigned to the container.

BACKGROUND OF THE INVENTION

In many industries there exists a need for a device capable of automatically recording the date and time at which all or a portion of a container is partially rotated to allow dumping of the contents of the container. For example, when waste management companies are hired to remove trash from an office complex, the contract typically specifies the number of days per week on which the trash must be removed. However, it is difficult to monitor these activities.

A need exists for a device which can sense when a container has been rotated any predetermined amount, thus providing a record of the event. Such a device should record the time and date of the rotation event. Further, a need exists for a device which will transmit this data to a receiver when interrogated. A need also exists for a device which can transmit an identifier assigned to the particular container. Such a device should also be able to store this information for later retrieval.

SUMMARY OF THE INVENTION

The invention described herein is capable of detecting a partial revolution of all or a portion of a container, storing the date and time of the partial rotation event, transmitting an ID number at the time of the partial rotation event, and on demand automatically transmitting the history of partial revolution events for a period of time such as a week, month, or year depending upon storage capacity in the unit. One embodiment of this invention is a device to be attached to a trash dumpster which would transmit the ID of the container being dumped to a receiving unit on the truck rotating and dumping the container. The device would also store the date and time for later independent transmission to a separate receiver unit which might be used for an audit check for history of dumping of the container. The device on the truck which receives the ID information transmitted from the device mounted to the container might be a separate receiver unit or an electronic hub-mounted trip recorder unit mounted to one wheel of the truck. The invention described herein uses a radio frequency link to transfer data from the device mounted to the container to a receiving unit.

The invention has a housing or case containing an electronic printed circuit board, and a means of sensing a partial rotation of the device to which the housing is attached. This sensing device might be a mercury switch, a gravity actuated rotating switch, or simply a spring-loaded plunger type switch for detecting the partial rotation and opening of a portion of the container. A microprocessor chip on the printed circuit board is used to control the logic for sensing the partial rotation, to store the date and time of the partial rotation, and to control and monitor the radio frequency receiver circuitry and data transmission circuitry all contained on the printed circuit board.

Operation of the invention is extremely simple. In its most basic embodiment the device will simply transmit an equipment identification number each time it senses the partial rotation of the container to which it is attached and store internally the date and time of the partial rotation event. Then anytime the device receives a coded transmission from a separate transmitter/receiver device, which would normally be connected to a computer or computer terminal, the device would transmit the stored dates and times of the previous partial rotations and dumping events. Since a microprocessor is used within the invention, this processor can be used to maintain and then transmit other information which may be desirable for a particular application. Examples of this information would be weight and/or volume of material dumped at each partial rotation event. The transmission range between the device and the separate transmitters/receivers unit can be varied depending upon requirements of a particular application.

BRIEF DESCRIPTION OF THE DRAWINGS

For a more complete understanding of the present invention, and for further details and advantages thereof, reference is now made to the following Detailed Description taken in conjunction with the accompanying drawings, in which.

DETAILED DESCRIPTION OF THE INVENTION

Figure 1:
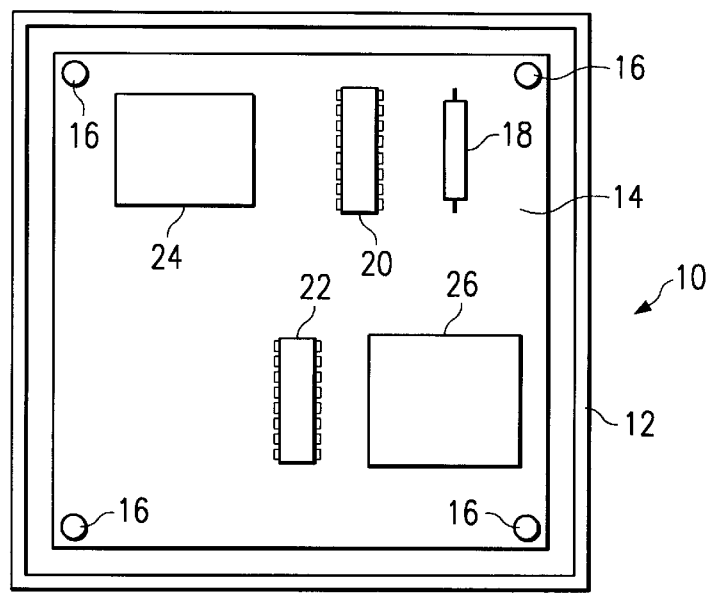
FIG. 1 is a front view partly broken away to show the printed circuit (p.c.) board.
Figure 2:
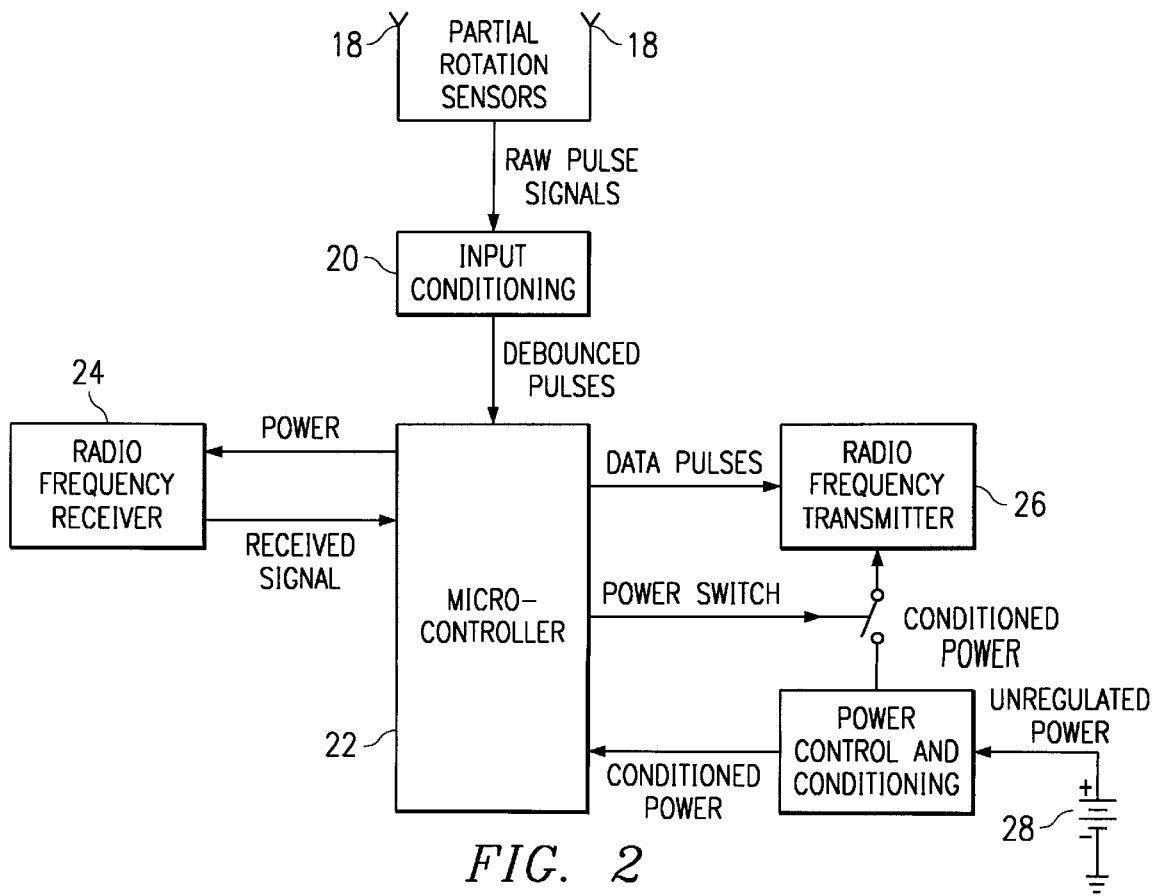
FIG. 2 is a systems overview showing the key functional electronic modules.

A rotation detector 10 embodying the present invention is disclosed in FIGS. 1 and 2. The device 10 has a housing 12 which is welded or otherwise attached to a container (not shown). A printed circuit board 14 is coupled to the housing by suitable fasteners 16. A circuit of electrical components is then interconnected by means of the board 14. The circuit includes a sensor 18 which can detect a rotation event of any predetermined amount and provide an output signal in response to such rotation. The sensor 18 can be a mercury or gravity actuated switch. Of course, any suitable mechanical and electromagnetic sensor could be used including, but not limited to, optical sensors, Hall effect devices, contact switches, gravity actuated sensors, or gear tooth sensors. Additional sensors can be attached to the device 10. For example, a strain gauge might be mounted to the container to determine the weight of the container.

The raw output signal from the sensor 18 can then be conditioned by a signal conditioner 20. In other words, the signal must be placed into an appropriate machine readable format. For example. the signal might be lengthened, debounced, and output at the correct signal level. An appropriate signal conditioner is the model 74LVQ025C by National Semiconductor of U.S.A.

The conditioned signal is then received by a processor 22. The processor 22 can include onboard RAM (Random Access Memory) and/or non-volatile memory for data storage. Further, it can include onboard ROM (Read Only Memory) for storing a control program. The control program stored within the processor 22 can control power conditioning and distribution; signal conditioning and signal processing functions. Further, the programmed processor 22 can control a receiver 24 and a transmitter 26 coupled to the processor 22. A suitable processor 22 is the model PIC16C54-LPI/SO by Microchip of Chandler, Ariz.

The entire circuit can be powered by a battery 28. Through the use of efficient power distribution algorithms, the processor 22 can extend battery life for many years. The processor 22 can be timed by a variety of methods, such as RC or LC Networks, but is usually operated with a crystal. This enables accurate tracking of such variables as time as well as many other functions.

In operation, a container having refuse is engaged by a dump truck. The container is then lifted and partially tilted, causing the trash to fall into the awaiting dump truck. The device 10 has also been rotated as detected by sensor 18. This information is processed. A date and time can be attached to the rotation event. This information can then be transmitted by a transmitter 26 to a remote receiver. This transmission takes place in a machine readable format such as Pulse Width Modulation (PWM), Pulse Count Modulation (PCM), analog or digital transmission, or any other scheme capable of creating usable data. As mentioned above, additional information can be transmitted. For example, if a strain gauge had been attached to the container as well, weight information might be included along with a time and date.

Likewise, the device might store the information until prompted by an interrogation signal. This prompting signal is received by a receiver 24. The prompt signal is then processed by the processor 22 and the stored information transmitted. The prompt signal could be a radio frequency beacon or a coded start signal (which would be decoded by the processor 22 after being received by the receiver 24) or a unique input from the sensor 18. The prompt signal can be generated by a master receiver unit set up to receive the incoming data from the device 10. The master receiver would itself be triggered to broadcast the beacon by a detector circuit, direct operator instruction, or other sensors to detect either the presence of the unit or a desire to retrieve data. Upon receipt of the prompt signal, the device 10 can transmit an identification code, history, status data, previously stored data, and any other information relative to its ability to collect data, including information from other sensors connected to the processor 22.

Full two-way communication with the device 10 also enables the unit to be reprogrammed, accept new parameters and instructions, store needed data, and so forth, without the necessity of changing processors, RAM or ROM chips, or otherwise intrusively interfering with the unit. In this way, the unit can be reprogrammed in the field without requiring that it be removed from service, thereby reducing the cost of upgrading the unit's capabilities at a future time.

Although preferred embodiments of the invention have been described in the foregoing Detailed Description and illustrated in the accompanying drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modifications and substitutions of parts and elements as fall within the spirit of the scope of the invention.

We claim:

1. A method of detecting and transmitting data of a partial revolution of a container, said method comprising the steps of:

(a) detecting a partial revolution event with a partial revolution detector mounted on said container, said partial revolution detector having a sensor for sensing said partial revolution event of said container, said partial revolution event for dumping content from the container;

(b) storing data from said partial revolution event; and (c) transmitting said stored data in response to an interrogation signal.

2. The method of claim 1 wherein step (b) further comprises storing time data for said partial revolution event.

3. The method of claim 1 wherein step (c) further comprises transmitting an identifier assigned to said container.

4. An apparatus for detecting and transmitting data of a partial revolution of a container, said apparatus comprising:

detection means for detecting a partial revolution event of said container, said detection means being mounted to said container and having a sensor for sensing said partial revolution event, said partial revolution event for dumping content from the container;

memory means for storing data from said partial revolution event; and transmitter means for transmitting said stored data in response to an interrogation signal.

5. The apparatus of claim 4 further comprising a signal conditioner coupled to said sensor.

6. The apparatus of claim 4 further comprising a processor, coupled to said detection means and said transmitter means, for controlling the transmission of said stored data.

7. The apparatus of claim 6 further comprising a receiver coupled to said processor.

8. The apparatus of claim 6 wherein said processor comprises timing means and wherein said stored data comprises a time associated with said partial revolution event.

9. The apparatus of claim 4 wherein said sensor is a mercury switch.

10. The apparatus of claim 4 wherein said sensor is a gravity actuated switch.

11. The apparatus of claim 4 wherein said transmitter means comprises a radio frequency transmitter.

12. The apparatus of claim 4 wherein said transmitter means comprises a pulse count modulation transmitter.

13. The apparatus of claim 4 wherein said transmitter means comprises a pulse width modulation transmitter.

14. The apparatus of claim 4 further comprising a cover sealing attached to said housing.

15. The apparatus of claim 4 further comprising a remote data acquisition device.

16. the apparatus of claim 15 wherein said remote data acquisition device comprises an initiation signal transmitter.

17. The apparatus of claim 4 wherein said data comprises a date and time of said sensed event.

18. The apparatus of claim 4 wherein said data comprises a weight detected by a strain gauge coupled to said apparatus.

* * * * *